United States Patent
Decker et al.

(10) Patent No.: US 9,710,313 B2
(45) Date of Patent: Jul. 18, 2017

(54) METHOD AND SYSTEM FOR ENSURING INTEGRITY OF CRITICAL DATA

(71) Applicant: GE Aviation Systems LLC, Grand Rapids, MI (US)

(72) Inventors: Christian Reynolds Decker, Melbourne, FL (US); Troy Stephen Brown, Kalamazoo, MI (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 0 days.

(21) Appl. No.: 14/585,519

(22) Filed: Dec. 30, 2014

(65) Prior Publication Data

US 2016/0188381 A1   Jun. 30, 2016

(51) Int. Cl.
   *G06F 9/455*    (2006.01)
   *G06F 9/52*     (2006.01)
   *G06F 9/48*     (2006.01)

(52) U.S. Cl.
   CPC ............... *G06F 9/526* (2013.01); *G06F 9/52* (2013.01); *G06F 9/485* (2013.01)

(58) Field of Classification Search
   None
   See application file for complete search history.

(56) References Cited

U.S. PATENT DOCUMENTS

| | | | | |
|---|---|---|---|---|
| 6,631,394 B1* | 10/2003 | Ronkka | ................. | G06F 9/4812 |
| | | | | 701/102 |
| 2003/0002440 A1* | 1/2003 | Calvignac | ............... | G06F 9/526 |
| | | | | 370/229 |
| 2003/0105796 A1* | 6/2003 | Sandri | ................... | G06F 9/5011 |
| | | | | 718/104 |
| 2004/0032867 A1 | 2/2004 | Basso et al. | | |
| 2005/0216633 A1* | 9/2005 | Cavallo | ................... | G06F 13/24 |
| | | | | 710/260 |
| 2011/0285731 A1 | 11/2011 | Andre et al. | | |

OTHER PUBLICATIONS

"Semaphore (Programming)", pp. 1-6, Dec. 16, 2014, retrieved from https://en.wikipedia.org/w/index.php?title=Semaphore_(programming)&oldid=638407211 on Apr. 20, 2016.
European Search Report and Opinion issued in connection with corresponding EP Application No. 15200902.3 on May 2, 2016.

* cited by examiner

*Primary Examiner* — Lewis A Bullock, Jr.
*Assistant Examiner* — Melissa Alfred
(74) *Attorney, Agent, or Firm* — GE Global Patent Operation; William S. Munnerlyn

(57) ABSTRACT

A method and system for ensuring integrity of manipulatable critical data, including a processor configured to execute at least one restartable processing thread module, a shared memory communicatively coupled with the processor and having at least some manipulatable critical data wherein when request to restart the at least one restartable processing thread module is received, the at least one restartable processing thread module is restarted.

19 Claims, 2 Drawing Sheets

METHOD AND SYSTEM FOR ENSURING INTEGRITY OF CRITICAL DATA

BACKGROUND OF THE INVENTION

Computer systems operate by executing software and/or processing threads that may interact with data stored in memory. In some instances, the processing thread interact with the data only by reading the data, and performing a task, directed by the thread, without changing the data. In other instances, the processing thread may interact with the data by, for example, reading the data, executing some processing and/or or calculation of the data, and writing the resulting data back to the memory. In certain computer systems, for example, aircraft computer systems, processing threads may interact with data that may include critical data, that is, data essential to the operation of the system and/or aircraft.

BRIEF DESCRIPTION OF THE INVENTION

In one aspect, the invention relates to a method of ensuring integrity of critical data stored in a shared memory, including executing a restartable processing thread that manipulates the critical data, setting a semaphore having an indicator indicative of either a first state, where the restartable processing thread is manipulating the critical data, and a second state, where the restartable data is not manipulating the critical data, and in response to a restart request during the execution of the restartable processing thread, restarting the restartable processing thread when the semaphore is in the second state.

In another aspect, the invention relates to a system for ensuring integrity of manipulatable critical data, including a processor configured to execute at least one restartable processing thread module, a shared memory communicatively coupled with the processor and having at least some manipulatable critical data associated with the at least one restartable processing thread module and a semaphore mechanism associated with the at least one restartable processing thread module, wherein the semaphore mechanism has an indicator defining a first state indicative of the restartable processing thread module manipulating the critical data and a second state indicative of the restartable processing thread module not manipulating the critical data, and a broker module communicatively coupled with each of the processor and shared memory, and configured to receive a request to restart the at least one restartable processing thread module. When the broker module receives a request to restart the at least one restartable processing thread module, the broker module queries the semaphore mechanism, and when the broker module receives indication from the semaphore mechanism indicative of the second state, the broker module instructs the at least one restartable processing thread module to restart.

DESCRIPTION OF EMBODIMENTS OF THE INVENTION

The invention may be implemented in any computer and/or software environment utilizing a controlled restart of a processing thread and/or software module, wherein the thread/module may be configured to manipulate at least a portion of data critical to the operation of the system. As used herein, data critical to the operation of the system, or "critical data," may include data stored in a memory location, wherein loss of the critical data, or loss of integrity of the critical data, may result in failure of the system, and/or anything controllable by the system. Furthermore, critical data may describe all data critical to the operation of a system, or only a portion of all data critical to the operation of a system. Also as used herein, critical data is distinguishable from non-critical data (hereafter, "data") such that the loss of data, or loss of integrity of data, may not result in failure of the system, and/or anything controllable by the system. One example environment utilizing embodiments of the invention may include a computer system of an aircraft, and wherein loss of critical data may be catastrophic to the continued operation of the aircraft. While a catastrophic failure of an aircraft is described, embodiments of the invention may include ensuring the integrity of critical data, the loss of which may result in failures that may not be catastrophic, such as the loss of lighting systems, autopilot, inflight entertainment, etc. Thus, failures from loss of critical data other than catastrophic failure may be included.

Figure 1:
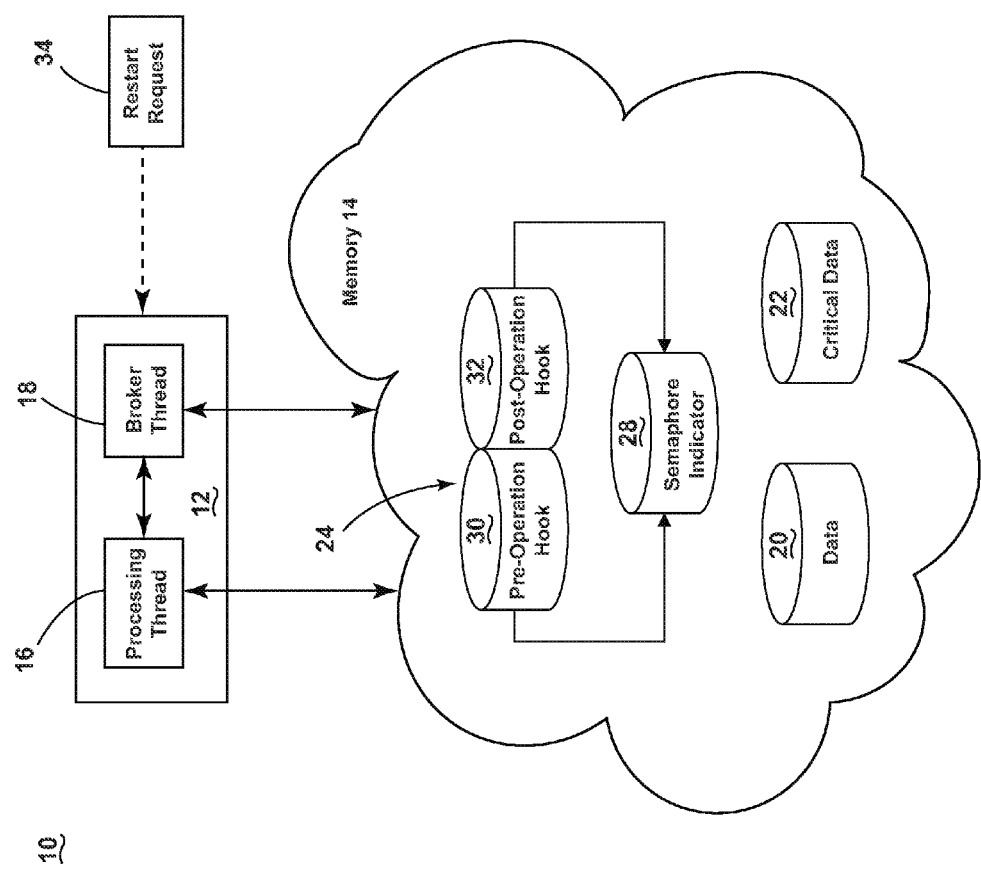
FIG. 1 is a schematic illustration of a system for managing a controlled restart of a restartable processing thread.

FIG. 1 schematically illustrates a system 10 for ensuring integrity of manipulatable critical data. The system 10 may comprise at least one processor 12 or controller communicatively coupled with memory 14 capable of storing at least a portion of data. The processor 12 may be further configured to execute at least one executable program module, such as a processing thread 16, and a broker thread 18 or module.

The processing thread 16 may further be configured such that the thread 16 is "restartable," that is, such that the thread 16 may be controllably interrupted or interruptible during execution, to restart execution of the processing task defined by the restartable processing thread 16. In this context, the restarting of the restartable processing thread 16 may, for example, cause the thread 16 to reinitialize, restart one or more calculations, and/or restart performance of the one or more tasks the processing thread 16 may be responsible for. Alternatively, embodiments of the invention may include a restartable processing thread 16 that includes a specific response to a "restart," which may include a temporary execution of a portion of a software module, followed by the continuation of whatever task the thread 16 was performing prior to the restart. In this sense, a restartable processing thread 16 may have one or more dynamic or predetermined responses to a request for restart the thread 16, depending on the context of the restart, and/or even by an individual type of restart request.

The broker thread 18 may be further communicatively coupled with each of the at least one processing threads 16, and may be configured to broker, or act as an intermediary between the at least one processing thread 16 and the memory 14, to control the restarting of the restartable processing threads 16. For example, in one embodiment, the at least one processing thread 16 may act as a programmable slave thread to the broker thread 18, such that the broker thread 18 may control or provide access to the restarting of the restartable processing thread 16. Moreover, embodiments of the invention may include at least one restartable processing thread 16 that may be configured to control a self-restarting of the thread 16.

The memory 14 may include random access memory (RAM), flash memory, or one or more different types of portable electronic memory, such as discs, or any suitable combination of these types of memory. The processor 12 may be operably coupled with the memory 14 such that one of the processor 12 and/or the memory 14 may include all or a portion of a computer program, processing thread 16, broker thread 18, and/or any combination therein, having an executable instruction set for controlling the operation system 10 and/or computer system of the aircraft. Any of the above-described programs, threads, modules, etc. may include a computer program product that may include machine-readable media for carrying or having machine-executable instructions or data structures stored thereon. Such machine-readable media may be any available media, which can be accessed by a general purpose or special purpose computer or other machine with a processor. Generally, such a computer program may include routines, programs, objects, components, data structures, algorithms, etc. that have the technical effect of performing particular tasks or implement particular abstract data types. Machine-executable instructions, associated data structures, and programs represent examples of program code for executing the exchange of information as disclosed herein. Machine-executable instructions may include, for example, instructions and data, which cause a general purpose computer, special purpose computer, processor 12, or special purpose processing machine to perform a certain function or group of functions.

While a single processor 12 is illustrated, embodiments of the invention may include multiple processors 12, such that, for example, the processing thread 16 and broker thread 18 may be executed on independent processors 12. Similarly, the while the memory 14 is illustrated as a unitary component, embodiments of the invention may include different memory 14 components communicatively accessible by any of the aforementioned devices. For example, a plurality of memories 14 may be utilized to provide redundancy of the memory, or to provide a distributed and/or redundant memory 14 configuration for data storage, in order to prevent system 10 failure due to a single memory 14 unit failure. Additional configurations may be included.

The memory 14 may be commonly accessible by and/or shared with the system 10, and may further include at least some data 20 and at least some critical data 22 accessible to each of the restartable processing thread 16 and broker thread 18, and at least one semaphore mechanism 24. The semaphore mechanism 24 may be associated with the at least one restartable processing thread 16, and may be further associated with at least a portion of the critical data 22.

Embodiments of the invention may include a number of different associations between the at least one processing thread 16, the at least one semaphore mechanism 24, and the critical data 22. For example, each processing thread 16 may be independently associated with a single corresponding semaphore mechanism 24. In another example, each processing thread 16 may be associated with a plurality of corresponding semaphore mechanisms 24, wherein each semaphore mechanism 24 is independently associated with a unique portion of the critical data 22, for instance, a known data variable. In yet another example, a single semaphore mechanism 24 associated with unique portion of the critical data 22 may be further associated with a plurality of corresponding processing threads 16 known to manipulate the associated unique portion of the critical data 22. Additional association variations between the at least one processing thread 16, the at least one semaphore mechanism 24, and the critical data 22, or overlapping combination of the variations described above, may be included.

The semaphore mechanism 24 may further comprise a semaphore indicator 28 defining a first state and a second state. The first state may be indicative of the at least one restartable processing thread 16 currently and/or actively manipulating at least a portion of the critical data 22 associated with the mechanism 24 and/or the thread 16. Conversely, the second state may be indicative of the at least one restartable processing thread 16 not currently and/or no actively manipulating the at least a portion of the critical data 22 associated with the mechanism 24 and/or the thread 16. Stated another way, the indicator 28 may provide a binary indication of when a processing thread 16 is or is not manipulating at least a portion of the critical data 22, according to the associations between the at least one processing thread 16, the at least one semaphore mechanism 24, and the critical data 22, as described above. In one example, the semaphore mechanism 24 and/or indicator 28 may be a single binary bit of data that may be read and/or written to, to indicate whether a restartable thread may be restarted. In this sense, the semaphore mechanism 24 and/or indicator 28 provide an indication of when critical data 22 is susceptible to corruption because a processing thread 16 may be manipulating at least a portion of said critical data 22.

The semaphore mechanism 24 may further include a portion of memory 14 and/or data 20 for storing a pre-operation "hook" 30, or an executable instruction, module, or routine, and a post-operation hook 32. Each of these respective hooks 30, 32 may be executable by at least one of the processing thread 16 and/or the broker thread 18, and include a predefined method of modifying and/or setting the semaphore indicator 28 to a predetermined state. For example, a processing thread 16, in preparation for manipulating a portion of critical data 22 associated with at least one of the thread 16 and/or semaphore mechanism 24, may execute the pre-operation hook 30, which in turn sets the semaphore indicator 24 to the first state, indicating the thread 16 is or will be manipulating the critical data 22. Similarly, a processing thread 16, that has completed manipulating a portion of critical data 22 associated with at least one of the thread 16 and/or semaphore mechanism 24, may execute the post-operation hook 32, which in turn sets the semaphore indicator 24 to the second state, indicating the thread 16 is not or is no longer manipulating the critical data 22. Alternative embodiments may include wherein the processing thread 16 communicates with, for example, the broker thread 18 and conveys an indication the thread 16 will manipulate and/or has completed manipulating a portion of critical data 22, and the broker thread 18, in turn, executes the respective hook 30, 32. Stated another way, embodiments of the invention may include updating the state of the semaphore mechanism 24 and/or indicator 28 when the restartable processing thread 16 at least one of begins manipulating the critical data 22 and/or ends manipulating the critical data 22. In yet another alternative embodiment of the invention, at least one of the processing thread 16 and/or broker thread 18 may directly access and manipulate the semaphore indicator 28 to provide indication of the respective state.

While one example of the indicator 28 and optionally corresponding hooks 30, 32 are described as providing a binary indication of the current state of the semaphore mechanism 24, embodiments of the invention may include any representation or indication of the at least two states described herein. For example, a tri-state indicator 28 may include a third state indicative that a processing thread 16 is reading a portion of critical data 22, but that the portion of critical data 22 is not being manipulated. Any number of states may be included.

At least one of the processor 12, restartable processing thread 16, and broker thread 18 may be further configured to receive a request to restart the restartable thread (hereafter, a "restart request" 34) from a source internal or external to the system 10. In one example, the restart request 34 may originate from another aircraft system, another processor 12, and/or one of the restartable processing thread 16 or broker thread 18, in accordance with the thread 16, 18 operation. In another example, the restart request 34 may originate from a command external to the system 10, for example, from a user input and/or pilot command to perform a task, such as to perform a recalculation of flight approach data after entering a new value into a flight control computer. Additional user input examples may be included. Regardless of where the restart request 34 originates, embodiments of the invention may include delivering the request 34 to at least the broker thread 18, which may occur directly, or indirectly, such as delivering the request 34 to the processing thread 16 and/or memory 14, which is further delivered to the broker 18.

Figure 2:
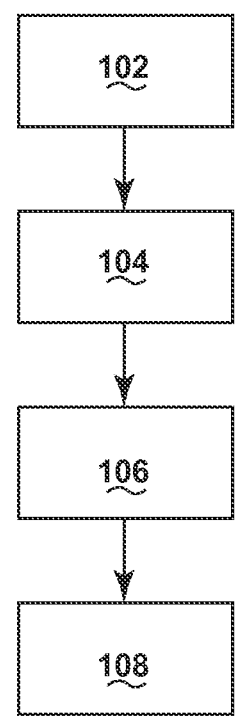
FIG. 2 is a flowchart showing a method of ensuring integrity of critical data.

FIG. 2 illustrated one exemplary method 100 of ensuring integrity of critical data 22 stored in shared memory 14. During operation of the system 10, the processor 12 may be executing 102 the restartable processing thread 16, which may in turn be manipulating the critical data 22. An associated semaphore mechanism 24 and/or indicator 28 may be set 104 to indicate a first or second state representative of whether the restartable processing thread 16 is manipulating the critical data 22. In response 106 to at least one of the processing thread 16 and/or broker thread 18 receiving a request 34 to restart the restartable processing thread 16, the broker thread 18 may query and/or continually monitor the state of the semaphore mechanism 24 and/or the semaphore indicator 28 to determine the if the indicator 28 indicates a first state or a second state. If the semaphore mechanism 24 and/or the semaphore indicator 28 indicates the second state (i.e. that the restartable processing thread 16 is not manipulating the critical data 22), the broker thread 18 may control or may instruct the processing thread 16 to initiate 108 a processing thread 16 restart, as described above.

Conversely, if the semaphore mechanism 24 and/or the semaphore indicator 28 indicates the first state (i.e. that the restartable processing thread 16 is manipulating the critical data 22), a restarting of the restartable processing thread 16 may result in loss of critical data 22 integrity, for example, if the processing thread 16 had been in the process of overwriting the critical data 22 when it was restarted. To protect the integrity of the critical data 22, the broker thread 18 may take alternative actions, such as by not restarting the processing thread 16 at that time. For example, the broker thread 18 may delay controlling or instructing the processing thread 16 to initiate a processing thread 16 restart for a period of time to allow for completion of the manipulation of the critical data 22. In another example, the broker thread 18 may delay any action and query and/or continually monitor the state of the semaphore mechanism 24 and/or the semaphore indicator 28 repeatedly until the indicator 28 indicates the first state, upon which it will control or instruct the processing thread 16 to initiate a processing thread 16 restart. In yet another example, the broker thread 18 may abort the restart all together, and wait for another received of a restart request 34.

The method 100 sequence described herein is for exemplary purposes only and is not meant to limit the method and/or apparatus in any way as it is understood that the portions of the method may proceed in a different logical order, additional or intervening portions may be included, or described portions of the method may be divided into multiple portions, or described portions of the method may be omitted without detracting from the described method. Many other possible embodiments and configurations in addition to that shown in the above figures are contemplated by the present disclosure.

The embodiments disclosed herein provide a method and apparatus of ensuring the integrity of critical data stored in a shared memory. The technical effect is that the above described embodiments enable the controlled restart of a restartable processing thread that may interact with the critical data only when the critical data is not susceptible to manipulation by said processing thread. One advantage that may be realized in the above embodiments is that the above described embodiments ensure the integrity of critical data in the system. Another advantage of the above-described embodiments is that the system may provide components such as the semaphore mechanism for a number of processing threads and/or independent portions of critical data, ensuring integrity protection at a discrete level without unnecessarily locking access or locking restartable processing threads when an unrelated processing thread is manipulating unrelated data.

Yet another advantage is that the system described herein may be incorporated into computer systems at varying levels of operations, such as at the operating system, hardware level, or application level, providing developers easy access to the benefits of such a system without having to explicitly initialize or knowingly call out the integral protection components and method. This results in ensuring integrity of critical data while appearing invisible to either the developer or end user. Furthermore, the above-described embodiments ensure the integrity of the critical data to a developer and/or end user without providing an opportunity for the developer/end user to incorrectly or accidently corrupt the critical data. In this sense, it provides a developer/end user the ability to initiate a "safe-restart" without burdening the developer/end user with the responsibility of ensuring the integrity of the critical data.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of ensuring integrity of critical data stored in a shared memory, the method comprising:

executing a restartable processing thread;
continuously monitoring, by a broker thread, the restartable processing thread and determining whether the restartable thread is manipulating the critical data;
storing a pre-operation hook and a post-operation hook in a portion of memory included in a semaphore, wherein the broker thread executes the pre-operation hook which sets a semaphore indicator to a first state, indicating a restartable processing thread is manipulating the critical data or executes the post-operation hook which sets the semaphore indicator to a second state, indicating that the restartable processing thread is not manipulating the critical data;
setting the semaphore indicator to either the first state or the second state based on whether the restartable thread is manipulating the critical data;
receiving, by the broker thread, a restart request during the execution of the restartable processing thread;
automatically determining whether the broker thread has executed the pre-operation hook or the post-operation hook by checking the semaphore indicator;
in response to the restart request, restarting the restartable processing thread when the semaphore is in the second state and denying the restart request when the semaphore is in the first state.

2. The method of claim 1 further comprising monitoring the state of the semaphore during the executing of the restartable processing thread.

3. The method of claim 2 further comprising delaying the restarting of the restartable processing thread when the semaphore is in the first state.

4. The method of claim 2, further comprising aborting the restarting of the restartable processing thread when the semaphore is in the first state.

5. The method of claim 1 wherein the restarting further comprising restarting, in response to a restart request originating from a user input.

6. The method of claim 1 further comprising controlling the state of the semaphore by setting the indicator to the first state while the restartable processing thread is manipulating the critical data.

7. The method of claim 6 further comprising controlling the state of the semaphore by setting the indicator to the second state while the restartable processing thread is not manipulating the critical data.

8. The method of claim 7 further comprising controlling, by at least one of the processing thread or a broker module, the state of the semaphore.

9. A system for ensuring integrity of critical data, comprising:
a processor configured to execute at least one restartable processing thread module;
a shared memory communicatively coupled with the processor and a semaphore mechanism associated with the at least one restartable processing thread module, wherein the semaphore mechanism has an indicator defining a first state indicative of the restartable processing thread module manipulating the critical data and a second state indicative of the restartable processing thread module not manipulating the critical data; and
a broker module communicatively coupled with each of the at least one restartable processing thread and shared memory, and configured to:
continuously monitor the restartable processing thread module and determine whether the restartable thread is manipulating the critical data,
store a pre-operation hook and a post-operation hook in a portion of memory included in the semaphore mechanism, wherein the broker thread executes the pre-operation hook which sets the indicator to a first state or executes the post-operation hook which sets the indicator to a second state,
set the indicator to either the first state or the second state based on whether the restartable thread module is manipulating the critical data,
receive a request to restart the at least one restartable processing thread module,
automatically determine whether the broker thread has executed the pre-operation hook or the post-operation hook by checking the indicator;
in response to the restart request, automatically restart the restartable processing thread module when the semaphore is in the second state and automatically deny the restart request when the semaphore is in the first state.

10. The system of claim 9 wherein the at least one restartable processing thread module is communicatively coupled with the semaphore mechanism, and wherein the restartable processing thread module updates the state of the semaphore mechanism when the restartable processing thread at least one of begins manipulating the critical data or ends manipulating the critical data.

11. The system of claim 9 wherein the at least one restartable processing thread module is communicatively coupled with the pre-operation hook and post-operation hook, and wherein the restartable processing thread module controls the execution of the pre-operation hook when the processing thread module begins manipulating the critical data and controls the execution of the post-operation hook when the processing thread module ends manipulating the critical data.

12. The system of claim 9 wherein the broker module is configured to receive the request to restart from a requestor external to the system.

13. The system of claim 12 wherein the requestor is a user.

14. The system of claim 9, wherein when the broker module receives indication from the semaphore mechanism indicative of the first state, the broker module instructs the at least one restartable processing thread module to delay the restart.

15. The system of claim 9, wherein when the broker module receives indication from the semaphore mechanism indicative of the first state, the broker module instructs the at least one restartable processing thread module to abort the restart.

16. The system of claim 9, wherein the semaphore mechanism is associated with a plurality of restartable processing thread modules.

17. The system of claim 9, wherein the restartable processing thread module is associated with a plurality of semaphore mechanisms, wherein each of the plurality of semaphore mechanisms has an indicator defining a first state indicative of the restartable processing thread module manipulating a unique respective portion of the critical data and a second state indicative of the restartable processing thread module not manipulating the unique respective portion of the critical data.

18. A computer program product, encoded on one or more non-transitory machine-readable media, comprising instructions that when executed by one or more computers cause the one or more computers to ensure the integrity of critical data stored in a shared memory by performing operations comprising:

executing a restartable processing thread;

continuously monitoring, by a broker thread, the restartable processing thread and determining whether the restartable thread is manipulating the critical data;

storing a pre-operation hook and a post-operation hook in a portion of memory included in a semaphore, wherein the broker thread executes the pre-operation hook which sets a semaphore indicator to a first state, indicating a restartable processing thread is manipulating the critical data or executes the post-operation hook which sets the semaphore indicator to a second state, indicating that the restartable processing thread is not manipulating the critical data;

setting the semaphore indicator to either the first state or the second state based on whether the restartable thread is manipulating the critical data;

receiving, by the broker thread, a restart request during the execution of the restartable processing thread;

automatically determining whether the broker thread has executed the pre-operation hook or the post-operation hook by checking the semaphore indicator;

in response to the restart request, restarting the restartable processing thread when the semaphore is in the second state and denying the restart request when the semaphore is in the first state.

19. The computer product of claim 18, further comprising delaying or aborting a restart of the restartable processing thread when the semaphore is set with the indicator indicating the first state.

\* \* \* \* \*